(12) United States Patent
Sato et al.

(10) Patent No.: US 6,990,714 B2
(45) Date of Patent: Jan. 31, 2006

(54) MODULAR SUBMERSIBLE REPAIRING SYSTEM AND REPAIRING METHOD

(75) Inventors: Katsuhiko Sato, Machida (JP); Motohiko Kimura, Yokohama (JP); Hiroaki Igakura, Yokohama (JP); Yutaka Togasawa, Yokohama (JP); Takuya Uehara, Ebina (JP); Yasuhiro Yuguchi, Yokohama (JP); Seiki Soramoto, Kawasaki (JP); Kenji Kurihara, Yokohama (JP); Yuuji Yasuda, Yokosuka (JP); Katsuhiko Naruse, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 122 days.

(21) Appl. No.: 10/773,164

(22) Filed: Feb. 9, 2004

(65) Prior Publication Data
US 2004/0196949 A1   Oct. 7, 2004

Related U.S. Application Data

(62) Division of application No. 10/009,996, filed as application No. PCT/JP01/03246 on Apr. 16, 2001, now Pat. No. 6,715,201.

(30) Foreign Application Priority Data
Apr. 14, 2000 (JP) ............................. 2001-113631

(51) Int. Cl.
*G21C 19/00* (2006.01)
(52) U.S. Cl. .................. 29/402.01; 29/407.05; 29/407.1; 29/723; 376/260
(58) Field of Classification Search ............. 29/402.01, 29/407.01, 407.05, 407.1, 709, 712, 723; 376/260, 263, 268
See application file for complete search history.

(56) References Cited

U.S. PATENT DOCUMENTS

| 5,046,895 A | 9/1991 | Baugh |
|---|---|---|
| 5,117,897 A | 6/1992 | Robert |

(Continued)

FOREIGN PATENT DOCUMENTS

DE    31 28 268    2/1983

(Continued)

OTHER PUBLICATIONS

Derwent Publications, AN 1987-317710, XP-002222601, JP 62-225997, Oct. 3, 1987.

(Continued)

*Primary Examiner*—David P. Bryant
*Assistant Examiner*—Jermie E. Cozart
(74) *Attorney, Agent, or Firm*—Oblon, Spivak, McClelland, Maier & Neustadt, P.C.

(57) ABSTRACT

A modular submersible repairing system includes a working unit having a tool module capable of repairing structures in a reactor. A scanning/pitching module is capable of being selectively connected to or disconnected from the tool module, and is provided with a scanning/pitching shaft for scanning or pitching the tool module. A submersible fan module is capable of being selectively connected to or disconnected from the scanning/pitching module. A first buoyant module keeps an orientation of the tool module. A base unit includes a manipulator module internally provided with an actuator driving mechanism. An adsorbing module is capable of being detachably mounted on the manipulator module and a wall. A second buoyant module keeps the orientation of the manipulator module. The scanning/pitching module and the manipulator module are provided with a submersible connecting device capable of being operated in water for engagement and disengagement.

1 Claim, 8 Drawing Sheets

U.S. PATENT DOCUMENTS

| | | |
|---|---|---|
| 5,305,358 A | 4/1994 | Wrobel |
| 5,519,741 A | 5/1996 | Suzuki et al. |
| 5,864,595 A | 1/1999 | Burrows et al. |
| 5,878,099 A | 3/1999 | Burrows et al. |
| 6,179,776 B1 | 1/2001 | Adams et al. |

FOREIGN PATENT DOCUMENTS

| | | |
|---|---|---|
| JP | 172332/1986 | 6/1986 |
| JP | 166079/1989 | 11/1989 |
| JP | 4-217478 | 8/1992 |
| JP | 9-15377 | 1/1997 |
| JP | 10-123287 | 5/1998 |
| JP | 11-188674 | 7/1999 |
| WO | WO 01/21479 | 3/2001 |

OTHER PUBLICATIONS

Patent Abstracts of Japan, JP 2-216389, Aug. 29, 1990.

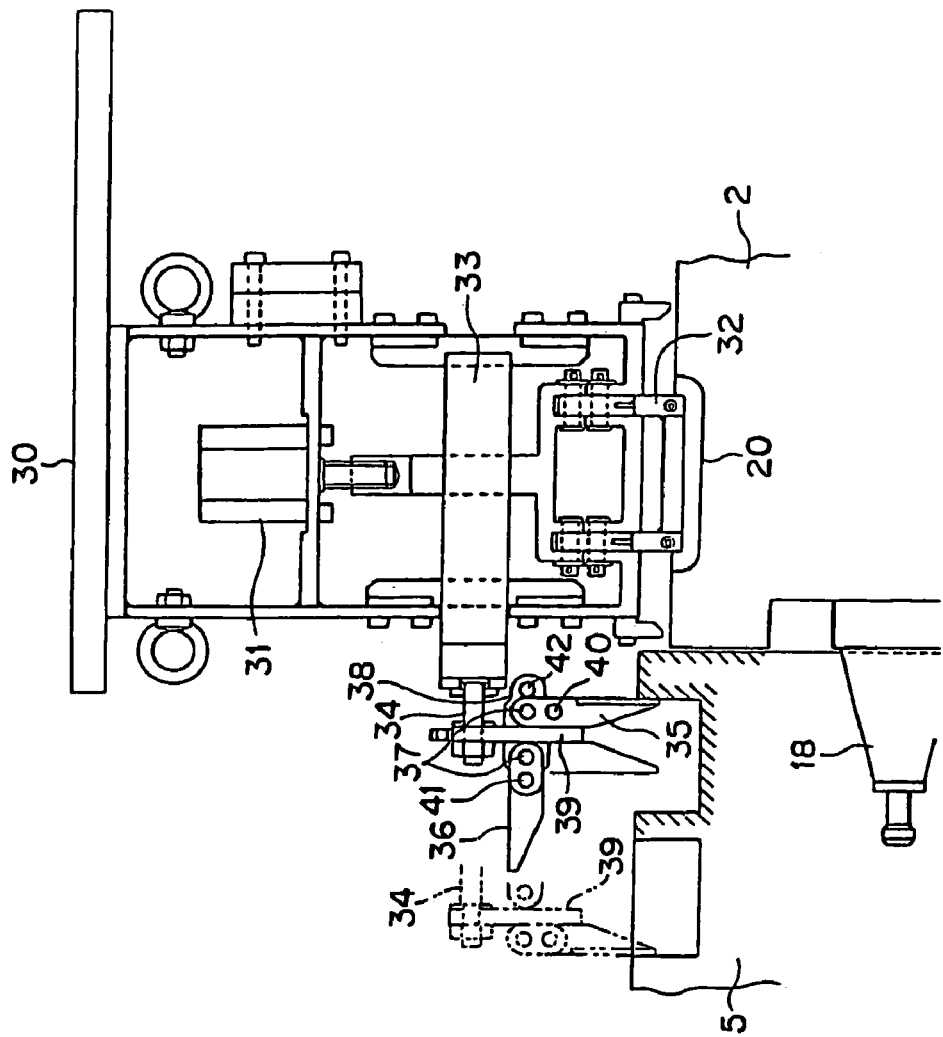
F I G. 4(a)
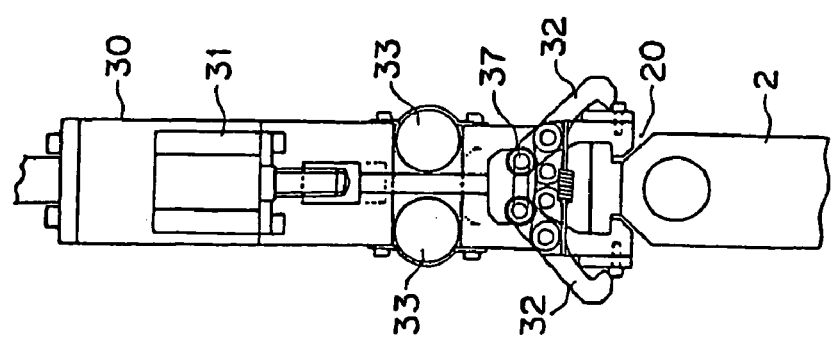
F I G. 4(b)

MODULAR SUBMERSIBLE REPAIRING SYSTEM AND REPAIRING METHOD

CROSS REFERENCE TO RELATED APPLICATIONS

The present invention claims priority to and is related to U.S. patent applications Ser. No. 10/009,996 filed on Dec. 14, 2001, now U.S. Pat. No. 6,715,201 B1 which is the national stage of international application PCT/JP01/03246, filed on Apr. 16, 2001. The entire contents of each of these applications are incorporated herein by reference.

TECHNICAL FIELD

The present invention relates to a repairing system for the emergency-repairing of a reactor vessel and in-pile structures in, for example, a nuclear power plant or the like, and a repairing method.

BACKGROUND ART

Stuctures of a light-water reactor, such as a boiling-water reactor, are formed of materials having a sufficient corrosion resistance and high-temperature strength in an environment of high temperatures, such as austenitic stainless steels or nickel-base alloys.

However, there is apprehension about the quality degradation of the materials of the members difficult to change of the structures due to exposure to a severe environment during the long-term operation of the plant or the detrimental irradiation with neutrons. Particularly, weld zones are subject to the potential danger of stress-corrosion cracking due to the sensitization of the materials by weld heat input and residual tensile stress.

A shroud supporting fuel assemblies, among the structures, is particularly subject to the influence of neutrons produced by the fuel assemblies and is highly subject to stress-corrosion cracking. Various working systems for the inspection for soundness and preventive maintenance of structures highly subject to damaging danger have been invented and practically applied. However, since those working systems are intended to carry out work efficiently for entire weld lines, the working systems are large, need much time for preparatory work, are large in scale and complicated and need well-trained operators for operation. Thus, the conventional working systems are unable to take such steps as occasion demands and to meet the demands of occasion.

DISCLOSURE OF THE INVENTION

The present invention has been made in view of those problems and it is therefore an object of the present invention to provide a partial-repairing system capable of dealing with various tasks somewhat efficiently, through, and of being inserted and installed in a reactor instantly, and highly maneuverable, and a repairing method.

A modular submersible repairing system according to the present invention includes a working unit; and a base unit; wherein the working unit includes: at least one type of tool module repairing structures in a reactor, a scanning/pitching module being selectively connected to or disconnected from the tool module, and provided with a scanning/pitching shaft for scanning or pitching the tool module, a submersible fan module being selectively connected to or disconnected from the scanning/pitching module, and a first buoyant module for keeping an orientation of the tool module; the base unit includes: a manipulator module internally provided with an actuator driving mechanism, a adsorbing module being detachably mounted on the manipulator module and of adsorbing to a wall, and a second buoyant module for keeping an orientation of the manipulator module; each of at least the scanning/pitching module and the manipulator module is provided with a submersible connecting device being operated in water for engagement and disengagement; configuration and functions of the modular submersible repairing system can be changed or modified according to various purposes of work in the reactor by properly combining those modules; and the modules can be connected together in the reactor by remotely operating the submersible connecting devices.

BRIEF DESCRIPTION OF THE DRAWINGS

FIGS. 4(*a*) and 4(*b*) are a side view and an elevational view, respectively, of a hoisting device according to the present invention;

BEST MODE FOR CARRYING OUT THE INVENTION

Preferred embodiments of the present invention will be described with reference to the accompanying drawings.

Figure 1:
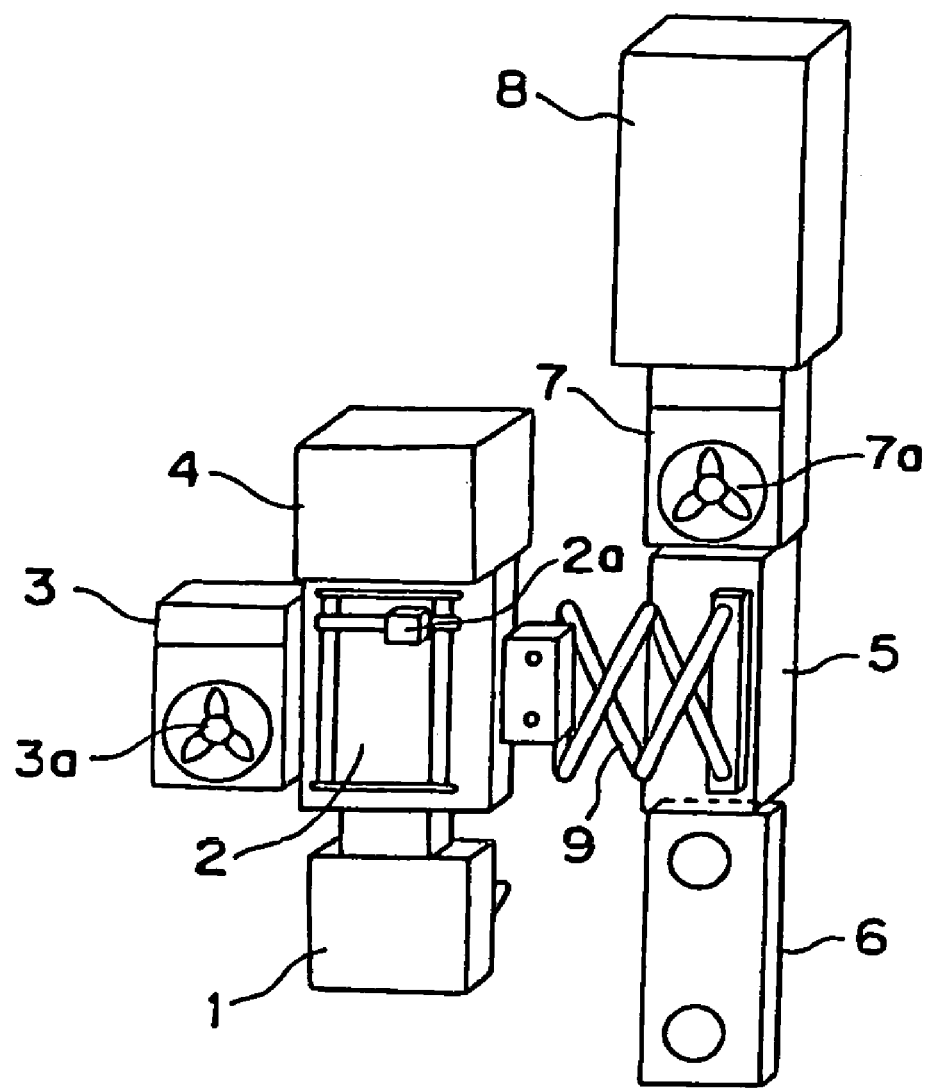
FIG. 1 is a schematic perspective view of a modular submersible repairing system in a preferred embodiment according to the present invention.

FIG. 1 is a schematic perspective view of a modular submersible repairing system in a preferred embodiment according to the present invention. The modular submersible repairing system has a working unit including one of various types of tool modules 1 capable of repairing structures, a scanning/pitching module 2 capable of selectively scanning and positioning the tool module 1, a submersible fan module 3 capable of being selectively connected to or disconnected from the scanning/pitching module 2, and a buoyant module 4 (first buoyant module); and a base unit including a manipulator module 5, a adsorbing module 6 capable of being selectively connected to or disconnected from the manipulator module 5 and provided with suction cups 6*a*, a submersible fan 7, and a buoyant module 8 (second buoyant module). The tool modules 1 are used selectively according to the purpose of work.

The scanning/pitching module 2 is provided with a scanning/pitching mechanism 2*a* for moving and scanning the tool module 1 mounted on the scanning/pitching module 2. The submersible fan modules 3 and 7 are provided with submersible fans 3*a* and 7*a*, respectively. The submersible fans 3a and 7a generate thrusts to press the submersible fan modules 3 and 7 against a wall, respectively. The buoyancies of the buoyant modules 4 and 8 are keeping it's orientation stably.

The manipulator module 5 is provided with a pantographic extension mechanism 9. The scanning/pitching module 2 can be detachably joined to the free end of the extension mechanism 9.

Figure 2B:
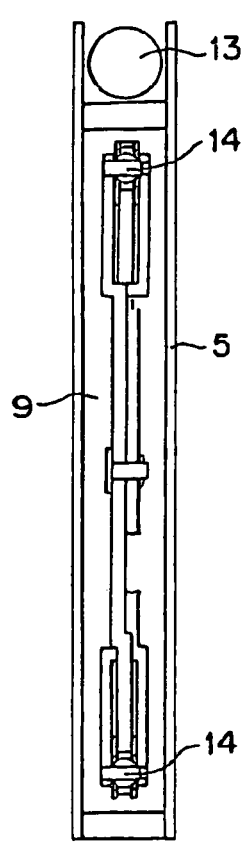
FIGS. 2(*a*) and 2(*b*) are a side view and an elevational view, respectively, of an extension mechanism according to the present invention.
Figure 2A:
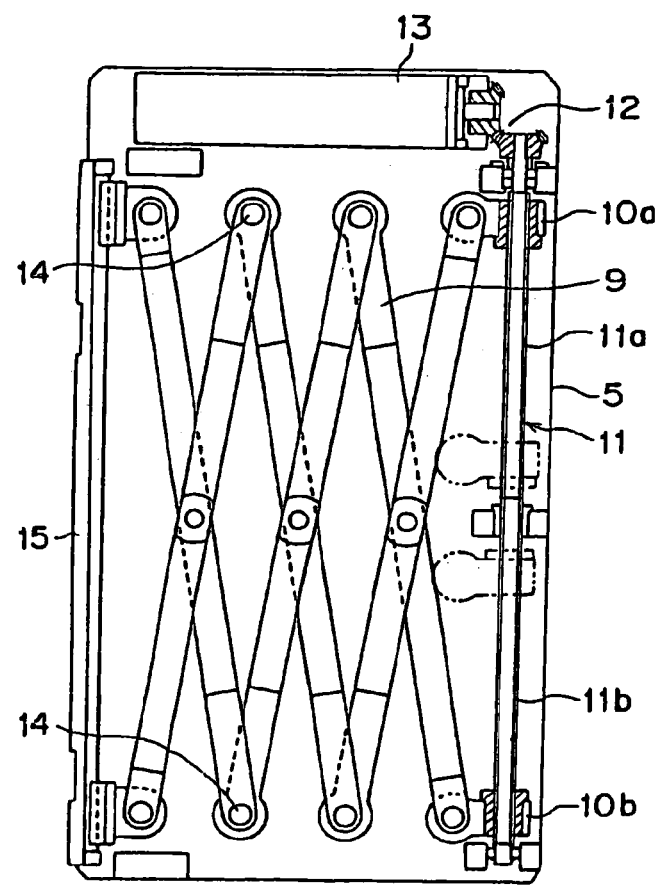

FIGS. 2(a) and 2(b) area side view and an elevational view, respectively, of the extension mechanism 9. Internally threaded nuts 10a and 10b attached to the upper and the lower base end, respectively, of the pantographic linkage of the extension mechanism 9 are screwed on a threaded shaft 11. The threaded shaft 11 has an upper threaded section 11a and a lower threaded section 11b provided with threads of the opposite hands, respectively. The upper nut 10a and the lower nut 10b are screwed on the upper threaded section 11a and the lower threaded section 11b, respectively. The threaded shaft 11 is interlocked through a bevel gear mechanism 12 to the drive shaft of a driving motor 13.

The joints of the pantographic linkage include bearings 14. The pantographic linkage is extendible. Since the joints of the pantographic linkage includes the bearings 14, the pantographic linkage is able to bend to some extent in a direction perpendicular to a reference plane. The other end of the pantographic linkage is connected to a connecting member 15 connecting the scanning/pitching module 2 and the extension mechanism 9 so as to be vertically slidable on the connecting member 15.

The driving motor 13 drives the threaded shaft 11 for rotation. Consequently, the nuts 10a and 10b are moved toward or away from each other to extend or contract the pantographic mechanism horizontally.

The modules are detachable from each other. Some modules including the scanning/pitching module 2 and the manipulator module 5 are provided with, for example, a submersible connecting device. The submersible connecting devices are remotely operated in water for connection or disconnection. At least the scanning/pitching module 2 and the manipulator module 5 are provided with submersible connecting devices, respectively. The tool module 1 may be provided with a submersible connecting device.

Figure 3:
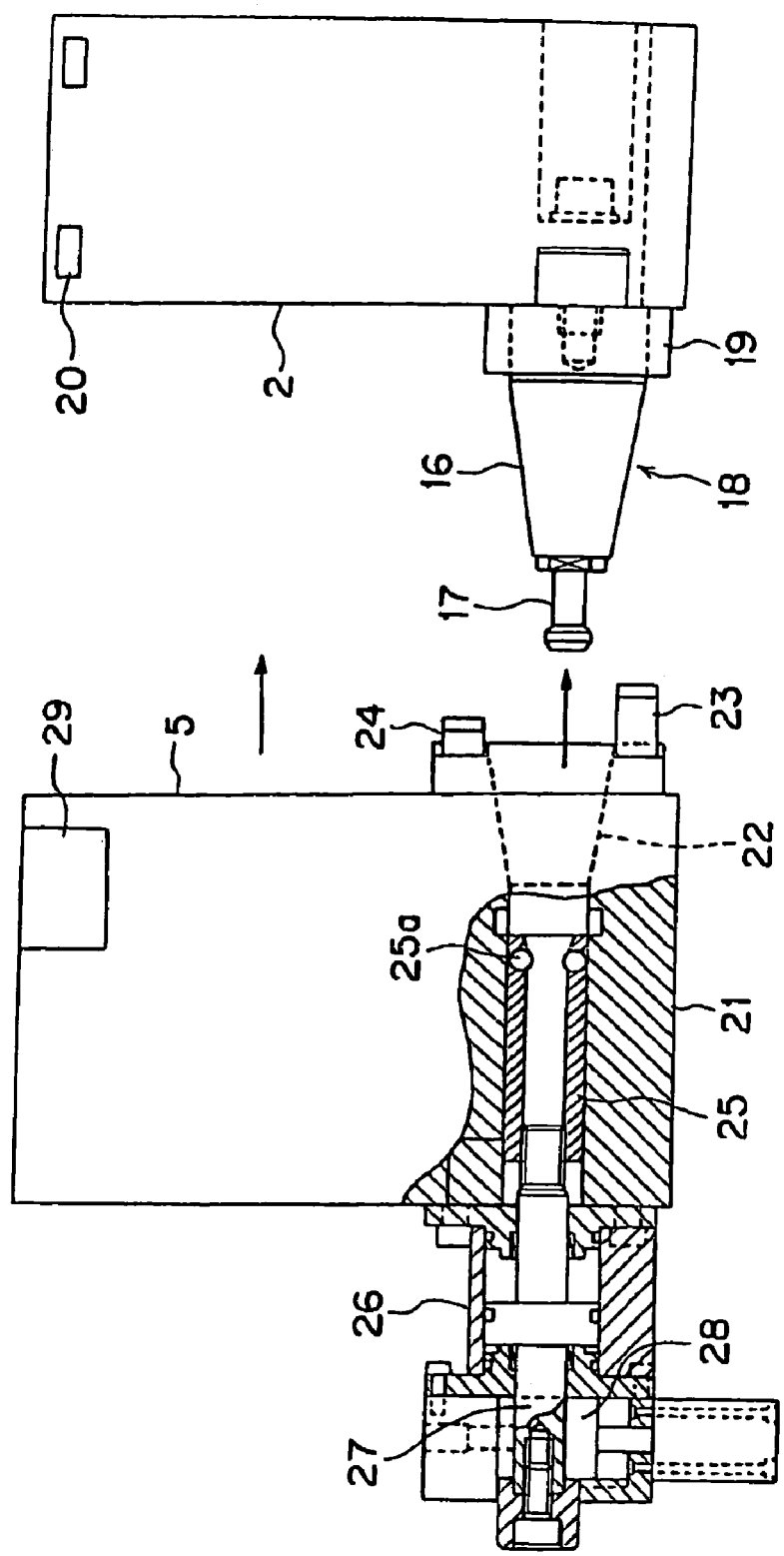
FIG. 3 illustrates a submersible connecting device according to the present invention.

FIG. 3 is a schematic view of the submersible connecting device. For example, the scanning/pitching module 2 is provided a male connecting unit 18 including a taper member 16 tapering toward its free end, and a draw-bolt 17 fastened to the extremity of the taper member 16. The male connecting unit 18 projects horizontally from the scanning/ pitching module 2. A key groove 19 is formed in the base part of the taper member 16 of the male connecting unit 18. Dints 20 are formed in an upper part of the scanning/pitching module 2. The hooks of a hoisting device, not shown, engage the dints 20.

On the other hand, the manipulator module 5, to which the scanning/pitching module 2 is connected, is provided with a female connecting unit 21. A taper hole 22 complementary to the taper member 16 of the male connecting unit 18 is formed in a part of the manipulator module 5 facing the scanning/pitching module 2. A key 23 to be engaged in the key groove 19, and an ultrasonic distance measuring device 24 for measuring the distance between the scanning/pitching module 2 and the manipulator module 5 in a noncontact measuring mode are disposed near the open end of the taper hole 22.

The female connecting unit 21 is provided with a gripping mechanism 25 capable of gripping the draw-bolt 17 and of pulling the male connecting unit 18 toward the female connecting unit 21. The gripping mechanism 25 is operated by a hydraulic cylinder actuator 26. A pneumatic locking device 28 is connected to one end of the hydraulic cylinder actuator 26. When the male connecting unit 18 is pulled into the gripping mechanism 25, the pneumatic locking device 28 engages a piston rod 27 included in the hydraulic cylinder actuator 26 to restrain the piston rod 27 from movement. A recess 29 is formed in an upper part of the manipulator module 5. A drawing claw engages the recess 29.

When connecting the scanning/pitching module 2 and the manipulator module 5, the taper part 16 of the male connecting unit 18 is inserted in the taper hole 22 of the female connecting unit 21, the stopping members 25a of the gripping mechanism 25 are engaged with the draw-bolt 17, and the hydraulic cylinder actuator 26 is operated to draw the draw-bolt 17 into the taper hole 22. After the scanning/ pitching module 2 and the manipulator module 5 have been thus connected, the pneumatic piston having the locking device 28 holds the piston rod 27 of the hydraulic cylinder actuator 26 fixedly to prevent the accidental disengagement of the male connecting unit 18 and the female connecting unit 21 of the submersible connecting device resulting from the faulty operation of the hydraulic cylinder actuator 26 due to faulty operations or loss of pressure applied to the hydraulic cylinder actuator 26 during work.

FIGS. 4(a) and 4(b) are a side view and an elevational view, respectively, of a hoisting device 30 for suspending the module or a combination of the modules in water and for connecting the module or a combination of the modules to an existing module. A pair of hooks 32 are supported on a lower end part of the hoisting device 30. The hooks 32 are turned about horizontal axes, respectively, by a pneumatic cylinder actuator 31 to engage the same with or disengage the same from the dints 20 of the module. The hoisting device 30 is provided with an arm 34 capable of being advanced toward and retracted away from the module to be connected to another module, for example, the manipulator module 5, by a pneumatic cylinder actuator 33. A drawing claw 35 and a pushing claw 36 are supported on the arm 34.

The claws 35 and 36 are connected pivotally by pin joints 37 to a claw support member 38 held on the arm 34. The claws 35 and 36 hung down from the claw support member 38 by their own weights. The drawing claw 35 is able to turn away when the arm 34 is moved in a pushing direction and is restrained from turning by a stopper 39 when the arm 34 is moved in a drawing direction. The pushing claw 36 is able to turn away when the arm 34 moves in the drawing direction and is restrained from turning by the stopper 39 when the arm 34 is moved in the pushing direction. The claws 35 and 36 and the claw support member 38 are provided with holes 40, 41 and 42, respectively. A pin is inserted in the holes 40 and 42 to hold the drawing claw 35 in a horizontal position when the drawing claw 35 is not used. A pin is inserted in the holes 41 and 42 to hold the pushing claw 36 in a horizontal position when the pushing claw 36 is not used.

When connecting the modules together in water contained in the reactor by a remotely controlled operation, the drawing claw 35 is set in a vertical position, the pushing claw 36 is set in a horizontal position, a hoisting hook driving mechanism including a linkage is operated by the pneumatic cylinder actuator 31 to engage the hooks 32 in the dints 20 of the module 2 provided with the male connecting unit 18, and the module 2 is lowered. The module 2 is moved in the reactor so that the male connecting unit 18 of the module 2 approaches the female unit 21 of the module 5, and hoisting wires are controlled so as to insert the taper part 16 in the taper hole 22 of the module 5. The taper part 16 is inserted in the taper hole 22 deep enough to enable the drawing claw 35 to engage in the recess 29 of the module 5 by a manual operation. Then, the pneumatic cylinder actuator 33 is actuated to move the arm 34 in the drawing direction. Consequently, the drawing claw 35 engaged in the recess 29 draws the female connecting unit 21 forcibly toward the male connecting unit 18. Thus, the gripping mechanism 25 is made to grip the draw-bolt 17 by a remotely controlled operation.

When disconnecting the modules from each other in water contained in the reactor and taking out the module 2 from the reactor, the drawing claw 35 set in a horizontal position and the pushing claw 36 set in a vertical position are inserted in the reactor, and the hooks 32 are engaged in the dints 20 of the module 2. Then, the gripping mechanism 25 is operated to release the draw-bolt 17 to disconnect the male connecting unit 18 from the female connecting unit 21. Generally, the taper part 16 cannot be removed from the taper hole 22 at this stage. Therefore, the arm 34 is moved in the pushing direction to push the female connecting unit 21 from the male connecting unit 18.

Figure 5:
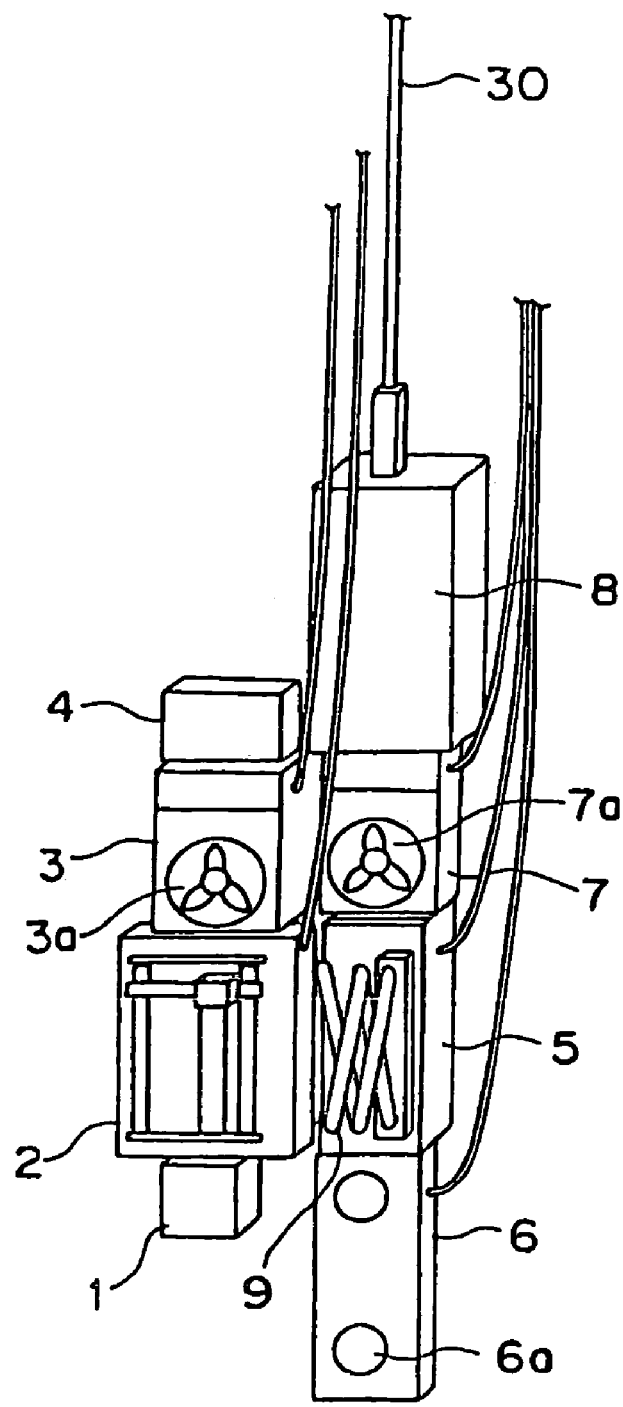
FIG. 5 illustrates operations of the modular submersible repairing system of the present invention in work for repairing the outer circumference of a shroud.
Figure 6:
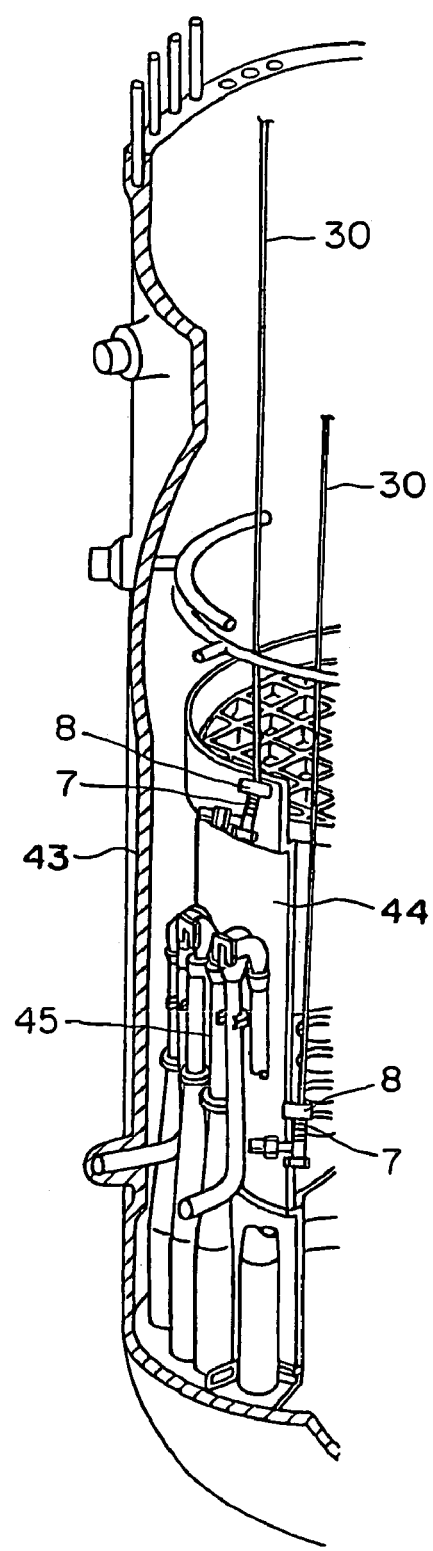
FIG. 6 illustrates the modular submersible repairing system shown in FIG. 5 as inserted in a reactor.

The modular submersible repairing system thus constructed carries out work for the maintenance of the shroud of a reactor in the following manner. The modules of the base unit and the working unit are assembled in a vertical arrangement as shown in FIG. 5 such that the base unit and the working unit have the smallest horizontal cross sections, respectively, to build a modular submersible repairing system meeting restrictions placed on the dimensions of the modular submersible-repairing system by a space between jet pumps 45 placed in a space between a pressure vessel 43 and a shroud 44. The modular submersible repairing system is suspended and lowered to a predetermined position as shown in FIG. 6, the submersible fan module 7 of the base unit is operated to move the modular submersible repairing system to the outer surface of the shroud 44 by a thrust produced by the submersible fan module 7. Then, the modular submersible repairing system is held fixedly on the shroud 44 by the agency of the suction cups 6a of the adsorbing module 6. The modular submersible repairing system is kept always in a fixed vertical position by the agency of the buoyant module 8 while the modular submersible repairing system is lowered in the pressure vessel 43.

The manipulator module 5 for work on the outer surface of the shroud 44 is provided with the pantographic extension mechanism 9. Since the pin joints of the extension mechanism 9 include the spherical bearings 14, the working unit can be moved along the outer surface of the shroud 44 into a space between the jet pumps 45 and the shroud 44 and can be moved near to an objective part. The submersible fan module 3 is operated while the extension mechanism 9 is extending, so that the working unit does not separate from the surface of the shroud 44 and moves along the surface of the shroud 44. The manipulator module 5 is locked after the working unit has been thus moved near to a desired position to complete the positioning of the working unit. Subsequently, the X- and the Y-shaft of the scanning/pitching module 2 are operated to carry out batch work. After the completion of the work, the foregoing procedure is reversed to take out the modular submersible repairing system from the reactor.

Figure 7:
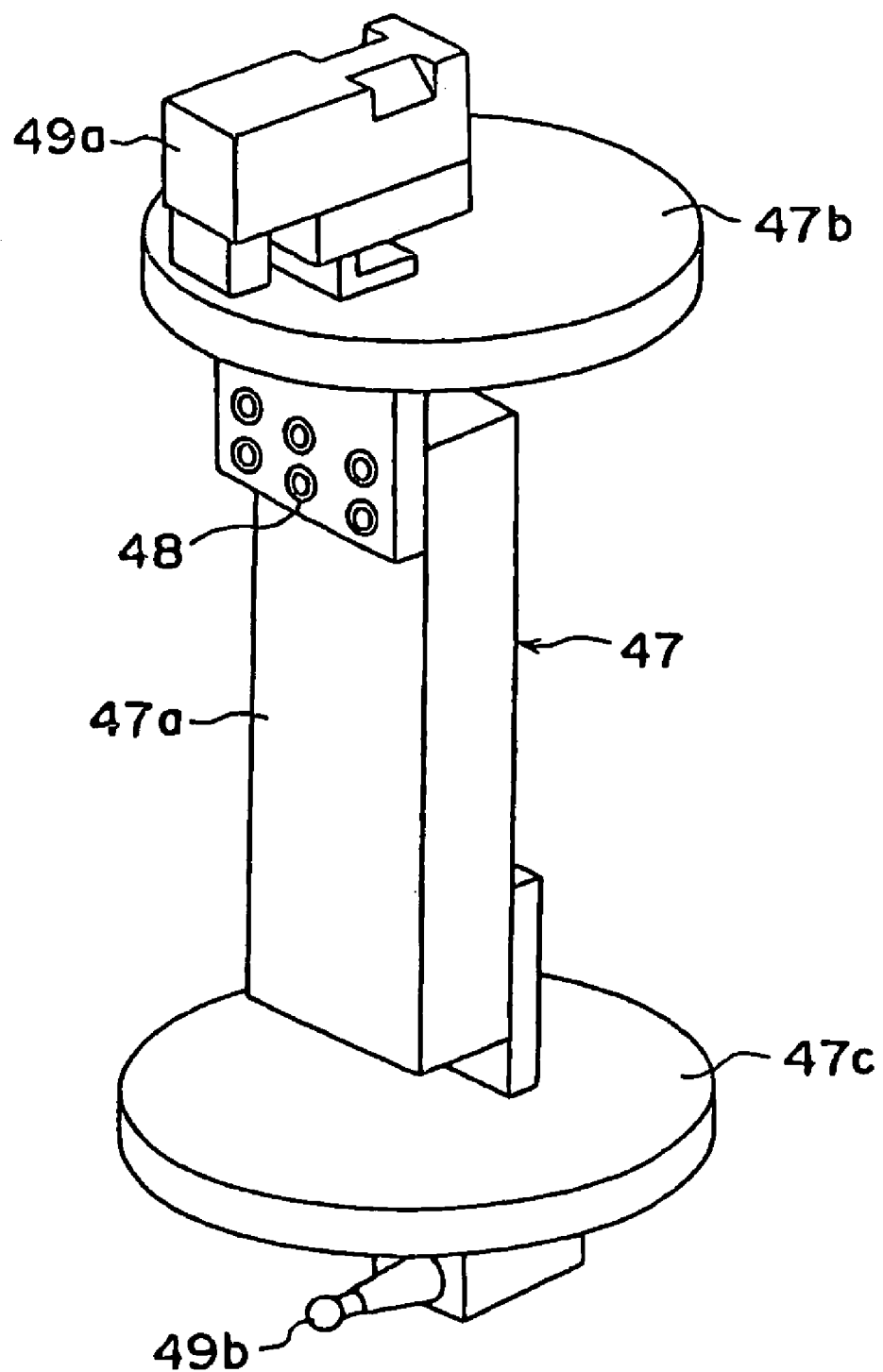
FIG. 7 is a perspective view of an adjusting module according to the present invention.

When repairing the inner surface of the shroud 44, the height of an adjusting module 47 is considered with reference to the height of a defect in the inner surface of the shroud 44 from a core plate 46 (FIG. 8), and an adjusting module 47 of a length and a shape suitable for repairing work is selected. Referring to FIG. 7 showing the adjusting module 47, end members 47b and 47c are connected to an upper part and a lower part, respectively, of a module body 47a of a predetermined length with bolts 48 so that height is adjustable. The end members 47b and 47c are provided with connecting units 49a and 49b, respectively.

Figure 8:
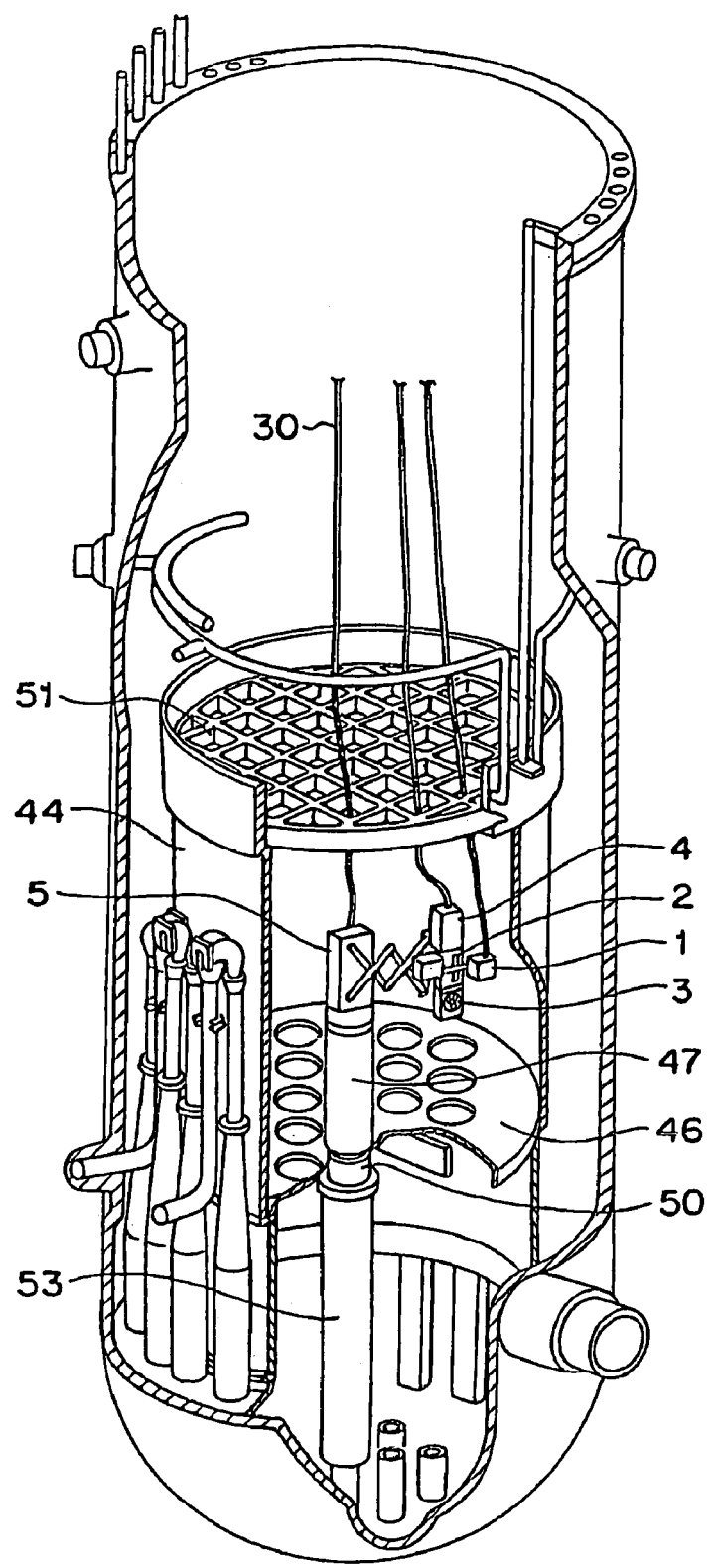
FIG. 8 is a partly cutaway perspective view of assistance in explaining work for repairing the inner circumference of a shroud by the modular submersible repairing system of the present invention.

Referring to FIG. 8, the base unit is built by connecting the manipulator module 5, the adjusting module 47 and a fixing module 50. The base unit is lowered through an opening of an upper grid plate 51 in the reactor by a cable of the hoisting device 30, and is inserted in a control rod guide pipe 53 held on the core plate 46. The orientation of the fixing module 50 is determined by engaging a locating pin, not shown, in a locating hole of the fixing module 50. A locking mechanism, not shown, included in the fixing module 50 is operated to fix the base unit in the control rod guide pipe 53. Then, the cable of the hoisting device 30 is disconnected from the base unit and is taken out of the reactor.

Subsequently, the scanning/pitching module 2 combined with the submersible fan module 3 and the buoyant module 4 is suspended and lowered in the reactor by the hoisting device 30. The scanning/pitching module 2 is passed through an opening of the upper grid plate 51 other than that through which the base unit was passed, the scanning/pitching module 2 is moved near to the manipulator module 5 in cooperation with the operation of the arm 34, and the female connecting unit 21 of the manipulator module 5 and the male connecting unit 18 of the scanning/pitching module 2 are engaged, in which the engagement of the taper member in the taper hole is assisted by the drawing claw 35 of the hoisting device 30. Upon the confirmation of the connection of the scanning/pitching module 2 and the manipulator module 5 from a signal provided by the ultrasonic distance measuring device 24, the locking device 28 is actuated to prevent the faulty operation of the hydraulic cylinder actuator 26. Then, the hooks 32 of the hoisting device 30 is disengaged from the scanning/pitching module 2 and the hoisting device 30 is taken out of the reactor.

Subsequently, the tool module 1 is suspended and lowered in the reactor by the hoisting device 30, and the female connecting unit of the scanning/pitching module 2 and the male connecting unit of the tool module 1 are engaged. After the modules have been thus connected, the manipulator module 5 is operated to move the working unit near to the objective part, the tool module 1 is pressed against the shroud by the agency of the submersible fan module 3, and the scanning mechanism of the scanning/pitching module 2 carries out batch work.

As apparent from the foregoing description, according to the present invention, the shape and configuration of the repairing system can be changed according to the condition of the object of work and is capable of carrying out repairing work for repairing structures of a boiling-water reactor which places severe dimensional restrictions. Various modules provided with standardized connecting units can be used for the efficient operation of the modular repairing system. Since the modules can be connected in water by a remotely controlled operation, the proper modules can be assembled in the reactor, the dimensional restrictions can be relaxed.

What is claimed is:

1. A repairing method using a modular submersible repairing system, said method comprising the steps of:
   installing a fixing module and a height adjusting module on a control rod guide pipe and a core plate, and mounting a manipulator module on the height adjusting module;
   holding a scanning/pitching module combined with a submersible fan module, a buoyant module and a tool module by a hoist device, and suspending the scanning/pitching module through a passage other than that through which the manipulator module has been carried onto the height adjusting module;
   connecting the scanning/pitching module to an extension mechanism included in the manipulator module by a remotely controlled operation;
   disconnecting the hoist device from the scanning/pitching module, operating the manipulator module to move the tool module connected to the scanning/pitching module near to an objective part to be repaired, and locating the tool module by the agency of the submersible fan module; and
   driving the tool module for scanning and repairing work by the scanning/pitching module.

* * * * *

UNITED STATES PATENT AND TRADEMARK OFFICE
CERTIFICATE OF CORRECTION

PATENT NO. : 6,990,714 B2
DATED : January 31, 2006
INVENTOR(S) : Sato et al.

It is certified that error appears in the above-identified patent and that said Letters Patent is hereby corrected as shown below:

<u>Title page,</u>
Item [30], Foreign Application Priority Data, should read:
-- [30]         Foreign Application Priority Data
        Apr. 14, 2000   (JP) ................ 2000-113631 --.

Signed and Sealed this

Eleventh Day of April, 2006

JON W. DUDAS
*Director of the United States Patent and Trademark Office*